United States Patent [19]

Kington et al.

[11] Patent Number: 5,664,413

[45] Date of Patent: Sep. 9, 1997

[54] DUAL PILOT RING FOR A GAS TURBINE ENGINE

[75] Inventors: Harry L. Kington, Scottsdale; Walter L. Meacham, Phoenix, both of Ariz.

[73] Assignee: AlliedSignal Inc., Morris Township, Morris County, N.J.

[21] Appl. No.: 412,641

[22] Filed: Mar. 29, 1995

[51] Int. Cl.$^6$ ................................................. F02C 7/28
[52] U.S. Cl. .................. 60/39.32; 60/39.36; 415/174.5
[58] Field of Search ........................ 60/39.31, 39.32, 60/39.36, 39.75, 760; 417/407; 415/170.1, 174.5

[56] References Cited

U.S. PATENT DOCUMENTS

| | | | |
|---|---|---|---|
| 2,748,568 | 6/1956 | Budworth | 60/39.36 |
| 2,938,659 | 5/1960 | Judson et al. | 417/407 |
| 3,115,011 | 12/1963 | Deinhardt et al. | 60/39.36 |
| 3,116,908 | 1/1964 | Wosika | 60/39.36 |
| 3,263,424 | 8/1966 | Birmann | 60/39.32 |
| 3,623,318 | 11/1971 | Shank | 60/39.75 |
| 4,009,568 | 3/1977 | King et al. | 60/39.31 |
| 4,932,207 | 6/1990 | Harris et al. | 60/39.36 |
| 5,074,111 | 12/1991 | Harris et al. | 60/39.32 |
| 5,125,228 | 6/1992 | Jewess et al. | 60/39.36 |
| 5,161,945 | 11/1992 | Clevenger et al. | 60/39.36 |
| 5,235,803 | 8/1993 | Rodgers | 60/39.36 |
| 5,265,412 | 11/1993 | Bagepalli et al. | 60/39.32 |
| 5,271,220 | 12/1993 | Holmes et al. | 60/39.32 |
| 5,320,488 | 6/1994 | Meade et al. | 415/174.5 |
| 5,332,358 | 7/1994 | Hemmelgarn et al. | 415/174.5 |

*Primary Examiner*—Timothy S. Thorpe
*Attorney, Agent, or Firm*—Jerry J. Holden; James W. McFarland

[57] ABSTRACT

A gas turbine engine having a compressor rotor and turbine rotor in back-to-back relation and annular groove therebetween. A nonrotating seal is disposed in the groove. A dual pilot ring is disposed at the radial inner end of the groove. The dual pilot ring includes an inner annular ring and an outer annular ring radially spaced apart to define a clearance gap. The inner ring is mounted to radially facing piloting surfaces on both the compressor and turbine rotors and maintains concentricity between the two rotors as they grow at different thermal rates. The outer annular ring transfers axial loads between the rotors.

3 Claims, 2 Drawing Sheets

DUAL PILOT RING FOR A GAS TURBINE ENGINE

TECHNICAL FIELD

This invention relates generally to gas turbine engines having a centrifugal compressor and radial turbine in back-to-back relation, and in particular to a dual pilot ring used in such engines for maintaining concentricity between the turbine and compressor.

BACKGROUND OF THE INVENTION

FIG. 1 shows a cross-section of a gas turbine engine that has a compressor and turbine in back-to-back relation. Disposed between these two components is a prior art, one piece pilot ring 54. The pilot ring 54 serves two functions referred to as a radial function and an axial function.

The radial function is maintaining concentricity between the compressor rotor 35 and the turbine rotor 37. This requires the pilot ring 54 to maintain radial contact with both rotors during assembly of the engine and during operation. During operation of the engine, the radial growth due to thermal expansion of the turbine rotor is significantly greater than that of the compressor rotor. As a result, the pilot ring 54 must roll to accomplish the radial function.

The axial function is transferring the axial load between the two rotors which requires that the axial ends of the ring remain parallel. As a consequence, the ring cannot roll freely as the turbine rotor thermally grows at a faster rate than the compressor rotor, requiring large radial interference fits between the pilot ring and the rotors. Some of the disadvantages associated with large interference fits are that they require a large temperature difference of the components during assembly, the ring can pop off the compressor rotor if assembly is not completed quickly, clocking of the turbine relative to the compressor to achieve balance and "run out" is difficult, and large stresses can be generated in the ring causing it to yield which in turn can result in high vibrations in the engine.

Accordingly, there is a need for a pilot ring that overcomes the disadvantages of prior art pilot rings.

SUMMARY OF THE INVENTION

The disadvantages associated with single piece pilot rings are overcome with a dual pilot ring. The dual pilot ring uncouples the axial function from the radial function by providing an inner ring for radial piloting the compressor rotor and turbine rotor, and an outer ring for transmitting axial loads. The two rings are separated by a clearance gap. As a result, the inner ring is no longer constrained by axial loads and is free to roll as the two rotors thermally grow at different rates.

These and other objects, features and advantages of the present invention, are specifically set forth in, or will become apparent from, the following detailed description of a preferred embodiment of the invention then read in conjunction with the accompanying drawings.

DESCRIPTION OF THE PREFERRED EMBODIMENT

Figure 1:
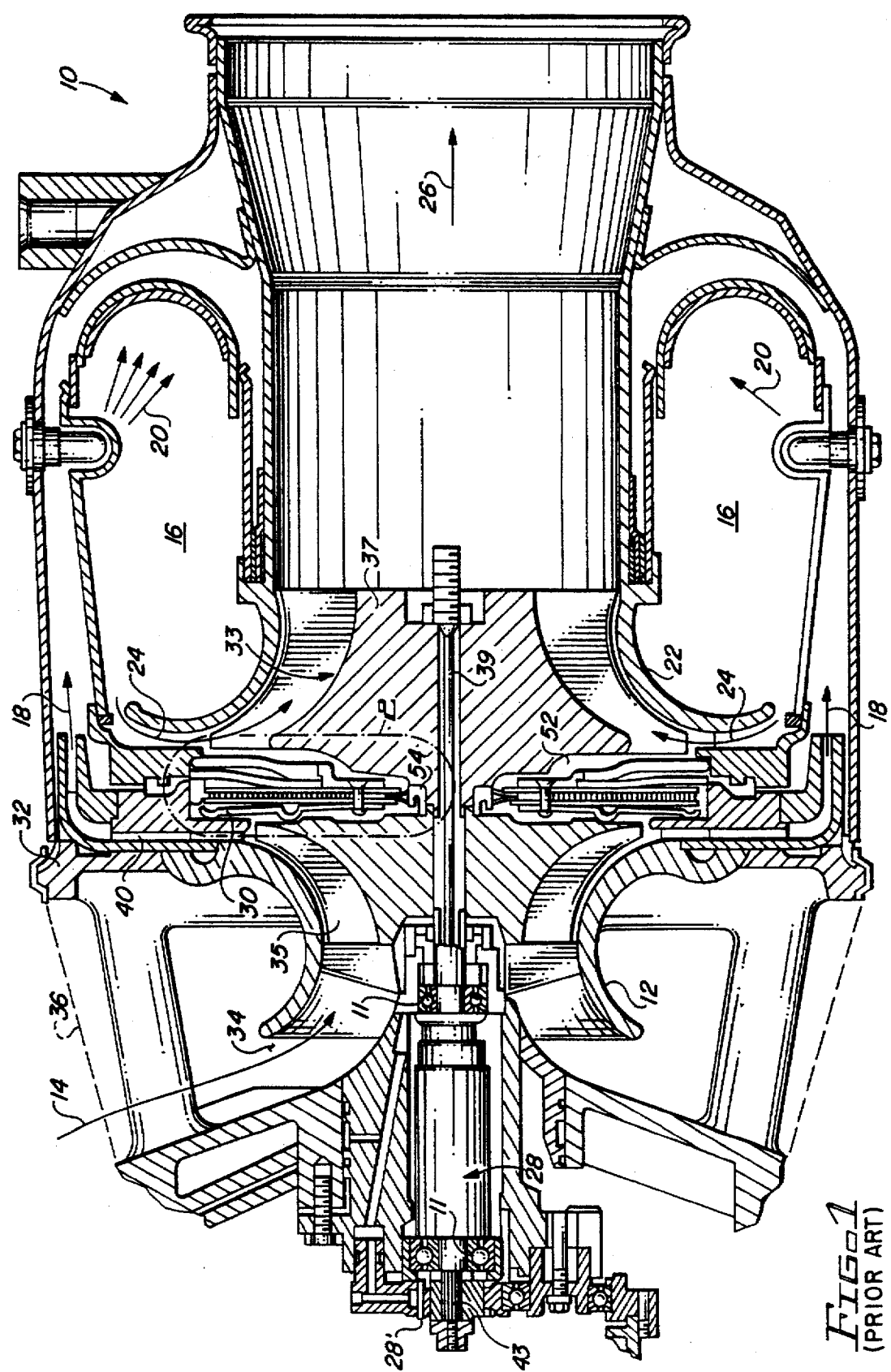
FIG. 1 is a cross-sectional view of a portion of a gas turbine engine having a prior art piloting ring.

FIG. 1 shows a cross-section of a gas turbine engine generally denoted by the reference numeral 10. The gas turbine engine 10 includes a compressor section 12 which in operation ingests ambient air, as indicated by arrow 14, and delivers this air pressurized to a combustion section 16, as indicated by arrow 18. A flow of fuel is added to the pressurized air in the combustion section 16 as indicated by arrow 20. The fuel and air are mixed and ignited to produce a flow of hot, pressurized combustion gas that flows through a turbine section 22 as indicated by arrow 24. The gas expands across the turbine section 22 causing it to rotate and produce shaft horsepower for driving the compressor section 12 and shaft 28 through the pilot ring 54. The gas exits the engine 10 through an exhaust represented by arrow 26. The shaft 28 has an externally extending portion 28' which can be used to drive an accessory such as a fuel pump, oil pump, or electric generator.

A housing 32 defines an inlet 34 which receives ambient air, represented by arrow 14, through an inlet screen 36. The housing 32 journals a rotor member generally referenced with numeral 33. The rotor member 33 includes a compressor rotor portion 35, a turbine rotor portion 37, and an elongate tie bolt 39. Cooperatively, the portions 33, 35, tie bolt 39, and shaft portion 28' substantially complete the rotational assembly of the engine 10. The rotational assembly is journaled in the housing 32 by a pair of bearings 41 which sustain both radial and thrust loads. At its left end, viewing FIG. 1, the shaft portion 28' includes a splined drive coupling portion 43 through which shaft horsepower and be transferred to a gearbox (not shown).

The compressor rotor 35 and turbine rotor 37 are disposed in back-to-back relation and are axially spaced apart to define an annular groove 52 therebetween. At its radially inner end, the groove 52 terminates at a conventional, prior art piloting ring 54. Disposed within the groove 52 is a nonrotating, annular seal 30.

Figure 2:
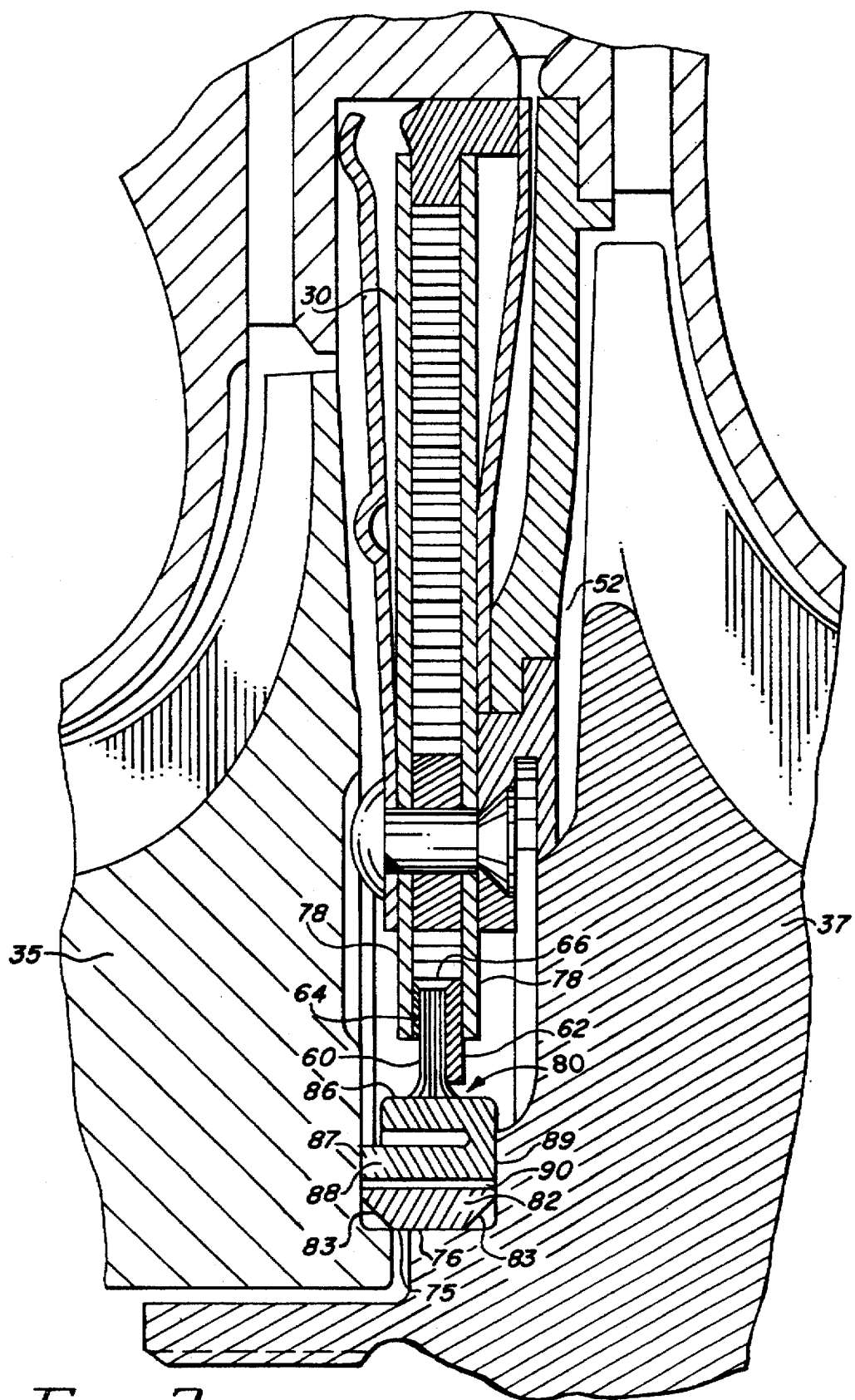
FIG. 2 is an enlarged fragmentary cross-sectional view of an encircled portion of FIG. 1 having the dual piloting ring contemplated by the present invention.

Referring to FIG. 2, a conventional brush seal 60 is disposed at the inner radial end of the seal 30 between a pair of face sheets 78. The brush seal 60 includes a pair of spaced apart annular side plates 62, 64 extending inward from an outer annular wall 66 to define a recess in which the brush or filaments are disposed.

In the preferred embodiment, the single piece pilot ring 54 is replaced with a dual pilot ring 80. The dual pilot ring 80 includes an inner annular ring 82, an outer annular ring 88 radially spaced apart from the inner ring 82 to define a clearance gap 90 therebetween. The inner ring 82 has essentially a rectangular cross-section except that the radial inner corners are cut to form angled surfaces 83. The surfaces 83 are shaped to accommodate the shape of the groove 52 at its innermost end. The inner surface of the ring 82 is mounted to piloting surfaces 75, 76 on the two rotors respectively. The outer ring 88 also has a rectangular cross-section. Importantly, the axial facing surfaces 87, 89 must be parallel. The outer surface 86 of the ring 88 sealingly contacts the brush seal 60. The inner ring 82 is slightly shorter than the outer ring 88, thereby simplifying manufacturing requirements controls and tolerance buildup.

The dual pilot ring 80 uncouples the axial function from the radial functions. The radial function is handled by the inner ring 82. The inner ring 82 no longer constrained by axial loads is free to roll and maintain concentricity as the turbine rotor 37 thermally grows more than the compressor rotor 35. The axial loads are transferred by the outer ring 88. As a result, assembly fits can be reduced to near line-to-line or slightly loose conditions, significantly reducing assembly related problems and component stresses.

Various modifications and alterations to the above described embodiment will be apparent to those skilled in the art. Accordingly, this description of the invention should be considered exemplary in nature and not as limiting to the scope and spirit of the invention as set forth in the following claims.

What is claimed is:

1. A gas turbine engine comprising:

an axially extending shaft journaled to a housing;

a compressor rotor and turbine rotor mounted to said shaft in back-to-back relation and axially spaced apart to define an annular groove therebetween, each of said rotors having a radially facing pilot surface which together define the radially inner end of said groove;

an annular seal extending from said housing into said groove;

a first annular ring mounted to said piloting surfaces; and a second annular ring circumscribing said first annular ring and radially spaced apart to define a gap therebetween, said second ring having a first axial facing surface in contact with said compressor rotor, and a second axial facing surface in contact with said turbine rotor.

2. The gas turbine engine of claim 1 wherein said first and second axial facing surfaces of said second ring are parallel.

3. The gas turbine engine of claim 1 wherein said first annular ring has a rectangular cross-section except that the radial inner corners are cut to form angled surfaces.

* * * * *